(12) United States Patent
Wang et al.

(10) Patent No.: US 10,334,184 B2
(45) Date of Patent: Jun. 25, 2019

(54) ELECTRONIC DEVICE WITH LIGHT DIFFUSER

(71) Applicant: Apple Inc., Cupertino, CA (US)

(72) Inventors: Ligang Wang, San Jose, CA (US); Miodrag Scepanovic, San Jose, CA (US); Neil MacKinnon, San Jose, CA (US); Zhenbin Ge, San Jose, CA (US)

(73) Assignee: Apple Inc., Cupertino, CA (US)

( * ) Notice: Subject to any disclaimer, the term of this patent is extended or adjusted under 35 U.S.C. 154(b) by 155 days.

(21) Appl. No.: 15/268,116

(22) Filed: Sep. 16, 2016

(65) Prior Publication Data

US 2018/0081093 A1 Mar. 22, 2018

(51) Int. Cl.
*H04N 5/33* (2006.01)
*G02B 5/02* (2006.01)

(52) U.S. Cl.
CPC ............ *H04N 5/33* (2013.01); *G02B 5/0231* (2013.01); *G02B 5/0294* (2013.01)

(58) Field of Classification Search
None
See application file for complete search history.

(56) References Cited

U.S. PATENT DOCUMENTS

| 7,501,656 | B2 | 3/2009 | Han et al. |
| 8,390,022 | B2 | 3/2013 | Hussell et al. |
| 8,547,009 | B2 | 10/2013 | Hussell et al. |
| 2002/0164876 | A1* | 11/2002 | Walitzki ............ B24B 37/044 438/692 |
| 2010/0157585 | A1 | 6/2010 | Diekmann et al. |
| 2013/0118548 | A1 | 5/2013 | Giri et al. |
| 2014/0036953 | A1* | 2/2014 | Kimura ................ G01J 5/16 374/121 |
| 2014/0306307 | A1* | 10/2014 | Forbes .............. H01L 31/0236 257/432 |
| 2016/0343918 | A1* | 11/2016 | Yamada ................ H01L 33/54 |
| 2018/0006431 | A1* | 1/2018 | Winer .................... G06T 7/50 |

* cited by examiner

*Primary Examiner* — Eileen M Adams
(74) *Attorney, Agent, or Firm* — Treyz Law Group, P.C.; G. Victor Treyz; Michael H. Lyons

(57) ABSTRACT

An electronic device may have an optical system that includes one or more light-based components. The light-based components may include light-emitting components such as light-emitting diodes or lasers and may include light-detecting components such as photodiodes or digital image sensors. The optical system may include a light diffuser. The light diffuser may diffuse light that is being detected by a light-detecting component or may diffuse light that is being emitted by a light-emitting component. Light diffusers in optical systems may be formed from patterned light diffuser layers on transparent substrates. Layers of sealant, thin glass layers, antireflection coatings, and other layers may be incorporated into the light diffusers. The light diffuser layers may operate at visible wavelengths and infrared wavelengths. An infrared light diffuser layer may be formed from a patterned silicon layer such as a patterned layer of hydrogenated amorphous silicon.

21 Claims, 6 Drawing Sheets

ELECTRONIC DEVICE WITH LIGHT DIFFUSER

FIELD

This relates generally to electronic devices, and, more particularly, to light diffusers for electronic devices.

BACKGROUND

Electronic devices such as laptop computers, cellular telephones, and other equipment are sometimes provided with light-based components such as light-emitting diodes, cameras, light sensors, and other light-emitting and light-detecting components.

Optical systems may be incorporated into an electronic device to help manipulate light associated with light-based components. For example, an optical system may be included in an electronic device to filter light based on wavelength, to focus or collimate light, or to otherwise manipulate light that is being emitted or detected with light-based components. In some situations, optical systems may include light diffusers. For example, a light diffuser may be used to diffuse incoming light to an ambient light sensor, thereby minimizing the sensor's dependence on the angle of incidence of incoming light rays.

If care is not taken, components for optical systems in an electronic device such as light diffusers may be lossy, overly complex, or bulky. It would therefore be desirable to be able to provide improved optical systems with light diffusers for electronic devices.

SUMMARY

An electronic device may have an optical system that includes one or more light-based components. The light-based components may include light-emitting components such as light-emitting diodes or lasers and/or may include light-detecting components such as photodiodes or digital image sensors.

An optical system may include a light diffuser. The light diffuser may diffuse light that is being detected by a light-detecting component or may diffuse light that is being emitted by a light-emitting component. The light diffuser may operate at visible wavelengths and/or infrared wavelengths.

Light diffusers in an optical system may be formed from patterned light diffuser layers on transparent substrates. Layers of sealant, thin glass layers, antireflection coatings, and other layers may be incorporated into the light diffusers.

An infrared light diffuser layer may be formed from a patterned silicon layer such as a patterned layer of hydrogenated amorphous silicon on a transparent substrate. The silicon layer may have an index of refraction that is greater than 2.5 at infrared wavelengths of interest. For example, the silicon layer may have an index of refraction of at least 3.5 at 940 nm.

DETAILED DESCRIPTION

Figure 1:
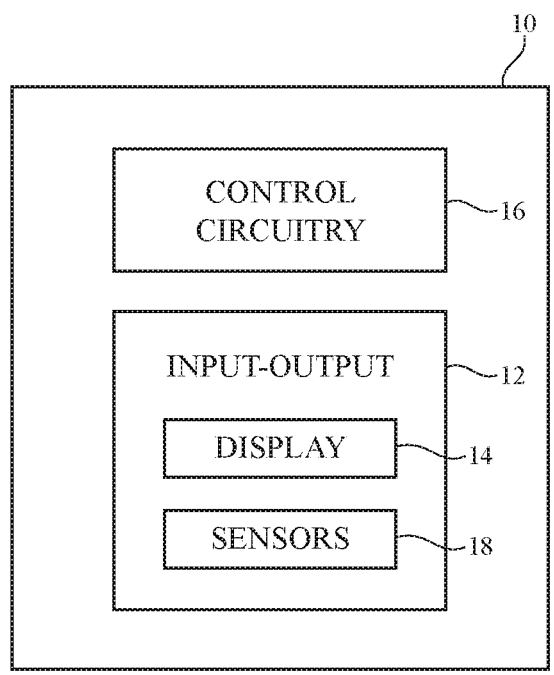
FIG. 1 is a schematic diagram of an illustrative electronic device with a light diffuser in accordance with an embodiment.

An illustrative electronic device of the type that may be provided with one or more light-based components is shown in FIG. 1. Electronic device 10 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

As shown in FIG. 1, electronic device 10 may have control circuitry 16. Control circuitry 16 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of device 10. The processing circuitry may be based on one or more microprocessors, microcontrollers, digital signal processors, baseband processors, power management units, audio chips, application specific integrated circuits, etc.

Input-output circuitry in device 10 such as input-output devices 12 may be used to allow data to be supplied to device 10 and to allow data to be provided from device 10 to external devices. Input-output devices 12 may include buttons, joysticks, scrolling wheels, touch pads, key pads, keyboards, microphones, speakers, tone generators, vibrators, cameras, light-emitting diodes and other status indicators, data ports, etc. A user can control the operation of device 10 by supplying commands through input-output devices 12 and may receive status information and other output from device 10 using the output resources of input-output devices 12.

Input-output devices 12 may include one or more displays such as display 14. Display 14 may be a touch screen display that includes a touch sensor for gathering touch input from a user or display 14 may be insensitive to touch. A touch sensor for display 14 may be based on an array of capacitive touch sensor electrodes, acoustic touch sensor structures, resistive touch components, force-based touch sensor structures, a light-based touch sensor, or other suitable touch sensor arrangements.

Input-output devices 12 may also include sensors 18. Sensors 18 may include one or more ambient light sensors, a digital image sensor (camera) operating at visible and/or infrared wavelengths, a capacitive proximity sensor, a light-based proximity sensor, a magnetic sensor, an accelerometer, a force sensor, a touch sensor, a temperature sensor, a pressure sensor, a compass, a microphone or other sound sensor, or other sensors.

Device 10 may include light-based devices such as a light-based proximity sensor having a light emitter and an associated light detector that measures reflected light from an external objects, a monochrome or color ambient light sensor, a light-emitting diode used as a status indicator light, a camera, a camera flash or other light emitter for providing pulsed or continuous illumination, and/or other light-based components. These components may operate at visible light wavelengths and/or infrared light wavelengths. Light-based components in device 10 may be mounted in an electronic device housing, under portions a display, and/or in other suitable locations in device 10 and may be controlled by control circuitry 16. For example, control circuitry 16 may direct a light-emitting component to emit light and may direct a light-detecting component to capture an image or make an ambient light measurement or other light measurement.

Figure 2:
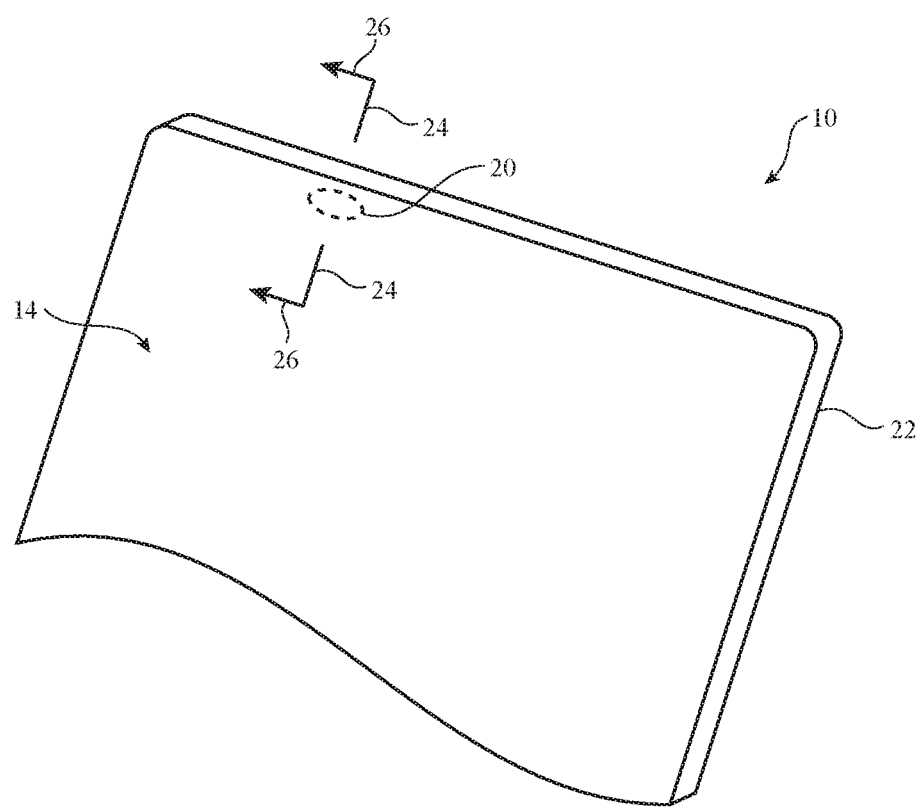
FIG. 2 is a perspective view of a portion of an electronic device in accordance with an embodiment.

A perspective view of a portion of an illustrative electronic device is shown in FIG. 2. In the example of FIG. 2, device 10 includes a display such as display 14 mounted in housing 22. Housing 22, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 22 may be formed using a unibody configuration in which some or all of housing 22 is machined or molded as a single structure or may be formed using multiple structures (e.g., an internal frame structure, one or more structures that form exterior housing surfaces, etc.).

Display 14 may be protected using a display cover layer such as a layer of transparent glass, clear plastic, sapphire, or other clear layer. Openings may be formed in the display cover layer. For example, an opening may be formed in the display cover layer to accommodate a button, a speaker port, or other components. Openings may be formed in housing 22 to form communications ports (e.g., an audio jack port, a digital data port, etc.), to form openings for buttons, etc.

Display 14 may include an array of pixels formed from liquid crystal display (LCD) components, an array of electrophoretic pixels, an array of plasma pixels, an array of organic light-emitting diode pixels or other light-emitting diodes, an array of electrowetting pixels, or pixels based on other display technologies. The array of pixels in display 14 forms an active area that displays images for a user of device 10. The active area may be rectangular or may have other suitable shapes.

The active area of display 14 may cover the entire front face of device 10 or an inactive area such as an inactive border region may run along one or more edges of the active area. Circuits, signal lines, and other structures that do not emit light for forming images may be located under the active area of display 14 and/or in the inactive border region. To hide circuitry and other components in an inactive border region from view by a user of device 10, the underside of the outermost layer of display 14 (e.g., the display cover layer or other display layer) may be coated with an opaque masking material such as a layer of black ink. Optical components (e.g., a camera, a light-based proximity sensor, an ambient light sensor, status indicator light-emitting diodes, camera flash components or other light emitters, or other light-based components) may be mounted in an opening or transparent window in housing 12, may be mounted under an opening or window in display 14 (e.g., under an active area of display 14 or under an inactive border region), or may be mounted in other portions of device 10. Configurations for device 10 in which light-based devices are mounted under a window in display 14 may sometimes be described herein as an example. This is, however, merely illustrative. Light-based components may be mounted under clear window members mounted in housing 12, in speaker openings, microphone ports, connector ports, and/or other openings in housing 12, under a button or other component, or in other suitable portions of device 10.

In the example of FIG. 2, device 10 has a window such as window 20 formed in display 14. Window 20 may be formed in an active area of display 14 (e.g., by creating small openings in non-critical portions of the pixel array of display 14) or may be formed in an inactive border region. If desired, window 20 may be formed using one or more openings in an opaque masking layer formed on the underside of a display cover layer of display 14 in an inactive display border region. Window 20 may be clear or may be covered with a material that transmits light at wavelengths of interest while blocking other wavelengths. For example, device 10 may include light-based components such as light emitters and light detectors (e.g., photodiodes, two-dimensional digital image sensors, etc.) that operate at infrared wavelengths (e.g., near infrared wavelengths such as wavelengths of 700 nm to 2500 nm). In this type of arrangement, window 20 may be covered with a layer of visible-light-blocking-and-infrared-light-transmitting material (e.g., ink, thin-film coatings deposited by physical vapor deposition).

Figure 3:
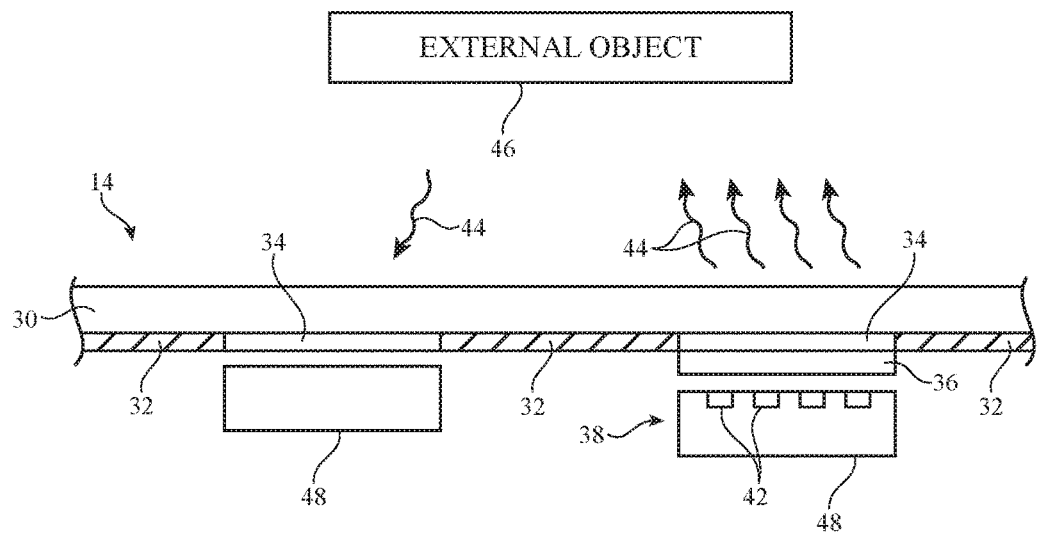
FIG. 3 is a cross-sectional side view of an illustrative light diffuser and associated light emitting and light detecting components in accordance with an embodiment.

FIG. 3 is a cross-sectional side view of display 14 of FIG. 2 taken along line 24 and viewed in direction 26 of FIG. 2. As shown in FIG. 3, display 14 may have a display cover layer such as display cover layer 30 (e.g., a glass layer, polymer layer, a layer of clear crystalline material such as sapphire, a ceramic layer, or other layer of transparent material). An active area of display 14 may have an array of pixels that displays images for a user of device 10 through layer 30. The array of pixels may be formed from an organic light-emitting diode display, an array of micro-light-emitting diodes formed from crystalline semiconductor dies, a liquid crystal display module, or other display structures. In an inactive border area of display 14, the inner surface of display cover layer 30 may be covered with a masking layer such as opaque masking layer 32, as shown in FIG. 3. Masking layer 32 may be formed from an opaque masking material such as black ink (as an example). One or more openings may be formed in opaque masking layer 32 to accommodate light-based components such as components 38 and 48 in the example of FIG. 3. These openings (see, e.g., window 20 of FIG. 2) may be covered with materials such as window coatings 34 of FIG. 3.

Components 38 and 48 may operate at visible light wavelengths and/or infrared light wavelengths. In the example of FIG. 3, components 38 and 48 operate at infrared light wavelengths, so coatings 34 may be formed from visible-light-blocking-and-infrared-light-transmitting ink or other coatings. This allows coatings 34 to hide components 38 and 48 from view from the exterior of device 10 while allowing infrared light to enter and/or exit device 10 and helps to match the appearance of window(s) 20 to the appearance of opaque masking layer 32.

In the illustrative configuration of FIG. 3, component 48 is an infrared light detecting component such as one or more infrared light detectors (e.g., infrared photodetectors such as infrared photodiodes, or other infrared light sensor elements) and/or an infrared camera (e.g., a two-dimensional infrared digital image sensor. Component 38 may be a light-emitting component such as one or more infrared light-emitting diodes and/or one or more infrared-light-emitting lasers. Component 38 may, for example, have an array of infrared lasers 42 on a common substrate 40. Lasers 42 may be vertical-cavity surface-emitting lasers operating at a near-infrared wavelength such as 940 nm and component 48 may be an infrared camera formed from a silicon image sensor (as an example).

During operation, the array of lasers 42 or other light-emitting structures in component 38 may emit infrared light 44. Diffuser 36 may diffuse light 44 to uniformly illuminate external object 46 with light 44 and thereby allow camera 48 to capture images of object 46. Object 46 may be, for example, a user's hand, face, eye (e.g., a user's iris), finger, or other body part, may be an inanimate object, or may be any other suitable external object. By diffusing light 44 uniformly, satisfactory infrared images of object 46 may be captured in a variety of ambient lighting conditions (e.g., indoor conditions with low amounts of ambient infrared light, dark outdoor conditions, etc.). If desired, component 38 may be a single infrared light emitter such as an infrared light-emitting diode and component 48 may be a single corresponding infrared light detector. The infrared light emitter and light detector in this type of configuration may form an infrared-light proximity detector. Arrangements in which component 38 includes an array of infrared lasers operating at 940 nm or other near-infrared wavelength (e.g., a wavelength from 700 to 2500 nm) and in which component 48 is an infrared camera are merely illustrative.

Figure 4:
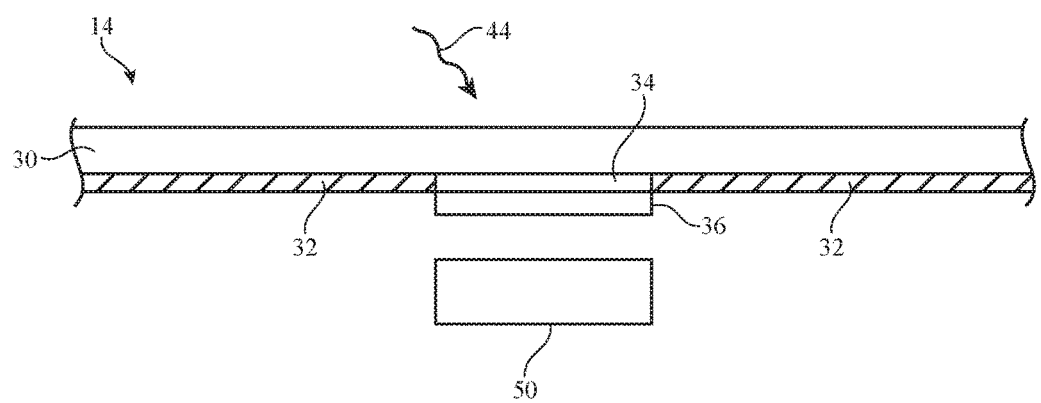
FIG. 4 is a cross-sectional side view of an illustrative light diffuser and associated ambient light sensor in accordance with an embodiment.

If desired, light diffuser 36 may form part of an optical system for device 10 that is used in other operating environments. For example, light-diffuser 36 of FIG. 4 may help diffuse incoming light 44 (e.g., ambient light) before light 44 is measured by an ambient light sensor such as ambient light sensor 50. In this type of arrangement, ambient light sensor 50 may measure the intensity and/or color of light 44 so that device 10 may make automatic adjustments to the intensity and/or color of display 14 based on the characteristics of the ambient light (e.g., measured ambient light intensity and/or measured ambient light color). Ambient light sensor 36 may be a monochrome ambient light sensor that measures the intensity of incoming light 44 (e.g., visible light) or may be a color ambient light sensor that uses multiple color channels to measure the color (e.g., color temperature, color coordinates, etc.) of light 44.

Light diffuser 36 may be formed from one or more layers of material. For example, light diffuser 36 may have a transparent substrate formed from a polymer layer or a layer of other suitable material (e.g., glass, ceramic, etc.). One or more additional layers may be formed on the light diffuser substrate. The additional layers may include rigid layers (e.g., thin glass layers attached to the substrate using polymer), may include flexible layers (e.g., a polymer coating), may include organic materials (e.g., polymer), may include inorganic layers (e.g., titanium oxide, aluminum oxide, and/or other metal oxides, silicon oxide, silicon nitride and other nitrides, silicon oxynitride, elemental materials such as silicon, etc.), may include materials deposited by screen printing or other printing techniques, may include materials deposited by spraying and other coating processes, may include materials deposited by chemical vapor deposition and/or physical vapor deposition (e.g., evaporation or sputtering), and/or may include other layers formed by depositing coatings on the substrate and/or attaching layers to the substrate with adhesive, etc. If desired, light-scattering particles may be included in a substrate and/or a coating layer to help diffuse light. Light-scattering features may also be formed by patterning one or more layers in diffuser 36 (e.g., using embossing techniques, wet etching techniques, dry etching techniques, laser processing techniques, fabrication processes based on machining, and/or other patterning techniques).

Figure 5:
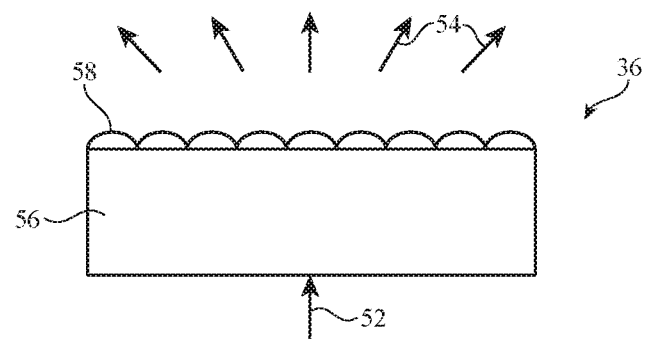
FIG. 5 is a cross-sectional side view of an illustrative light diffuser having a layer of light diffusing elements on a substrate in accordance with an embodiment.

Consider, as an example, the illustrative arrangement of light diffuser 36 of FIG. 5. As shown in FIG. 5, light diffuser 36 may include a substrate such as substrate 56. Substrate 56 may be formed from a layer of material such as glass, plastic, ceramic, or other material that is transparent at wavelengths of interest (e.g., visible and/or infrared light wavelengths). Substrate 56 may be free of light-scattering particles (e.g., particles of metal oxide, etc.) and/or substrate 56 may include light-scattering particles. Configurations in which substrate 56 is free of light-scattering particles may sometimes be described herein as an example.

A patterned light diffusing layer such as layer 58 may be formed on substrate 56. Layer 58 may be formed from an array of light-scattering elements (e.g., circles, rectangles, other polygons, pyramids, bumps, pits, etc.). Layer 58 may be formed by depositing a blanket film on substrate 56 and by patterning the deposited film using wet or dry etching techniques or other processing techniques, thereby creating a light diffusing layer with a desired textured pattern. The textured pattern may include light diffusing elements in an irregular pattern on substrate layer 56 (e.g., a layer of circles, rectangles, or other light-diffusing elements in pseudorandom locations, etc.). The light-scattering elements of layer 58 may have lateral dimensions of 20-30, 10-50 microns, more than 10 microns, less than 40 microns, or other suitable lateral dimensions (diameters) and may have thicknesses of 3-5 microns, more than 1 micron, less than 10 microns, or other suitable thicknesses. The light-scattering (light-diffusing) elements of layer 58 may have outlines (footprints when viewed form above) that are circular, that are rectangular, or that have other suitable shapes. The light-scattering elements may overlap each other or may be formed on separate areas of substrate 56.

In the illustrative arrangement of FIG. 5, light 52 (infrared and/or visible light) is being diffused by light diffuser 36 to produce diffuse (diffused) light 54. Light may be diffused upon passing through substrate 56 before passing through light-diffusing layer 58, and/or may be diffused upon passing through layer 58 before passing through substrate 56.

To effectively scatter light, light-diffusing layer 58 may be formed from a material that has a refractive index that differs from that of adjacent materials. In the arrangement of FIG. 5, layer 58 is exposed to ambient air (having a refractive index of 1) and may therefore be formed from a patterned photoimageable polymer, a patterned silicon oxide layer, or other relatively low refractive index material (e.g., a material that has a refractive index of about 1.5 and that therefore differs from the refractive index of air by about 0.5).

Arrangements of the type shown in FIG. 5 may expose layer 58 to moisture or other contaminants that could locally match the index of refraction of layer 58 and thereby reduce the effectiveness of layer 58 at diffusing light. To reduce the sensitivity of layer 58 to contamination, an arrangement of the type shown in FIG. 6 may be used to form diffuser 36. With the FIG. 6 configuration, layer 58 may be formed from a low-index inorganic material (e.g., silicon oxide) or polymer that is coated with a higher-index sealant layer such as sealant layer 60. The index of refraction of layer 58 may be, for example, 1.4-1.6 (as an example) and the index of refraction of sealant 60 may be at least 0.1 or at least 0.5 higher than the index of refraction of layers 58 (e.g., the index of sealant 60 may be more than 1.9, may be more than 2.0, etc.). Illustrative materials that may be used for forming sealant 60 include titanium oxide, silicon nitride, aluminum nitride, silicon oxynitride, aluminum oxynitride, other metal oxides, other oxynitrides, other nitrides, and other inorganic materials. Sealant 60 may be deposited by chemical vapor deposition and/or physical vapor deposition. The thickness of sealant 60 may be, for example, about 50-100 microns, more than 25 microns, less than 200 microns, or other suitable thickness. Optional antireflection coating layer 62 may be deposited on sealant layer 60. Layer 62 may be an organic or inorganic layer that has an index of refraction that is lower than sealant 60 (as an example) or may be formed from a stack of thin-film dielectric layers that form a multilayer thin-film antireflection coating. If desired, a thin layer of glass (e.g., glass layer 64 of FIG. 7) may be laminated onto diffuser 36 (e.g., using an interposed layer of polymer such as adhesive layer 66 of FIG. 7). Layer 64 may have a thickness of 0.05 to 0.5 mm, more than 0.05 mm, more than 0.1 mm, less than 0.2 mm, less than 0.1 mm, or other suitable thickness. Optional antireflection coating 62 may be formed on the surface of glass layer 64.

Figure 6:
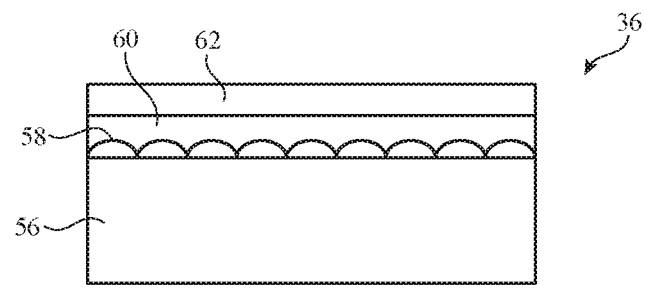
FIG. 6 is a cross-sectional side view of an illustrative light diffuser having a high refractive index sealant layer in accordance with an embodiment.
Figure 7:
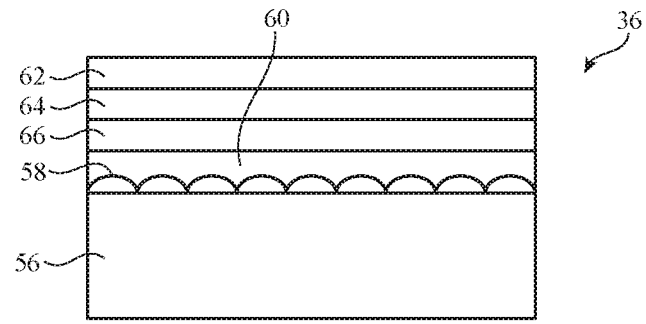
FIG. 7 is a cross-sectional side view of an illustrative light diffuser having an optional thin glass layer in accordance with an embodiment.

With arrangements of the type shown in FIGS. 6 and 7, a light-scattering surface is formed at the interface between layers 58 and 60 due to the refractive index difference between these layers. This interface is not exposed directly to air and is therefore not vulnerable to the presence of moisture or other contaminants.

Figure 8:
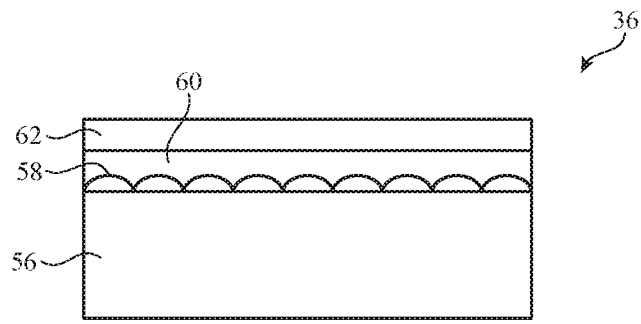
FIG. 8 is a cross-sectional side view of an illustrative light diffuser having a layer of diffusing elements covered with a sealant layer having a lower refractive index than the layer of diffusing elements in accordance with an embodiment.

In the illustrative configuration of FIG. 8, light diffuser layer 58 has been formed from a material with a relatively high index (e.g., an index n that is greater than 1.9 or greater than 2.0). To ensure that light is scattered satisfactorily, sealant layer 60 may have an index of refraction that is at least 0.1 below that of layer 60, that is at least 0.2 below that of layer 60, or that is at least 0.4 below that of layer 60. For example, sealant 60 may be formed from a polymer (e.g., optically clear adhesive) with a refractive index of 1.5. If desired, sealant 60 may be formed from a low-index inorganic material such as silicon oxide. Optional antireflection coating layer 62 may be formed on sealant 60.

Figure 9:
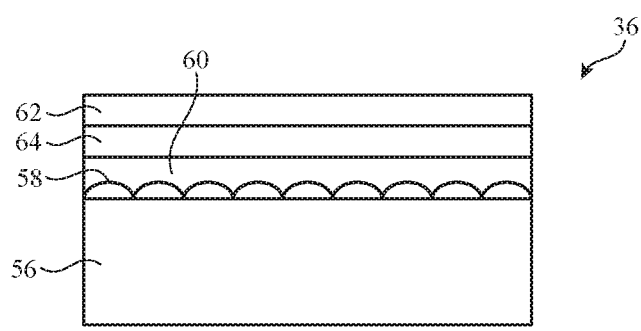
FIG. 9 is a cross-sectional side view of an illustrative light diffuser having a low index-of-refraction sealant interposed between a thin glass layer and a layer of higher index-of-refraction diffuser elements in accordance with an embodiment.

As shown in FIG. 9, optional thin glass layer 64 may, if desired, be directly attached to the polymer material of sealant 60 (e.g., sealant 60 may be cured by exposure to heat and/or ultraviolet light after thin glass layer 64 has been placed on top of liquid polymer precursor material for sealant 60). Optional antireflection layer 62 may be formed on thin glass layer 64.

Figure 10:
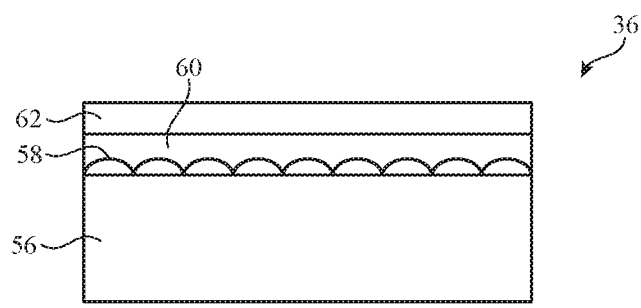
FIG. 10 is a cross-sectional side view of an illustrative light diffuser having a layer of high index-of-refraction diffuser elements such as patterned silicon diffuser elements in accordance with an embodiment.

In the example of FIG. 10, diffuser layer 58 has been formed from a material with a very high index of refraction (e.g., n>2.5, n>3.5, etc.). For example, layer 58 may be formed from a patterned (textured) layer of material such as silicon that has an index of refraction of 3.7 at 940 nm or other infrared wavelength of interest. Silicon layer 58 may be, for example, an amorphous silicon layer deposited using physical vapor deposition (e.g., sputtering), plasma enhanced chemical vapor deposition (PECVD), other chemical vapor deposition techniques, or a layer of amorphous silicon deposited using other amorphous silicon deposition processes. The deposited amorphous silicon may, if desired, by hydrogenated by incorporating hydrogen gas into the silicon layer during deposition. Hydrogenated amorphous silicon may exhibit enhanced infrared transmission at near infrared wavelengths (e.g., at 700-2500 nm, at 940 nm, etc.).

Silicon or other very high index-of-refraction material for layer 58 of diffuser 36 of FIG. 10 may be coated with a polymer, silicon oxide, or other low-index sealant 60 and may optionally be covered with antireflection layer 62. In configurations of the type shown in FIG. 10, sealant 60 may have an index of refraction that differs considerably from that of diffuser layer 58. For example, sealant 60 may have an index of refraction that is at least 0.5 lower than the index of refraction of layer 58, that is at least 1.0 lower than the index of layer 58, that is at least 1.5 lower than the index of layer 58, or that is at least 2.0 lower than the index of layer 58). These large refractive index differences allow light diffuser 36 of FIG. 10 to use relatively thin surface profiles (e.g., layer 58 may have surface features that are less than 3 microns thick, less than 2 microns thick, or less than 1 micron thick), thereby simplifying processing.

Figure 11:
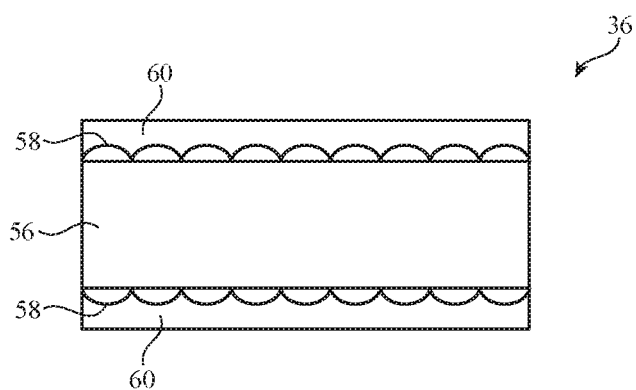
FIG. 11 is a cross-sectional side view of an illustrative two-sided light diffuser in accordance with an embodiment.

FIG. 11 shows how light diffuser 36 may have by a double-sided configuration with an upper diffuser layer 58 on an upper surface of substrate 56 and a lower diffuser layer 58 on an opposing lower layer of substrate 56. Layers 58 may be coated with sealant 60 and/or other coatings of the types shown in FIGS. 6, 7, 8, 9, and 10. The arrangement of FIG. 11 is illustrative.

The foregoing is merely illustrative and various modifications can be made to the described embodiments. The foregoing embodiments may be implemented individually or in any combination.

What is claimed is:

1. An optical system through which infrared light passes, comprising:
   a cover layer configured to transmit the infrared light;
   a substrate layer that is transparent to the infrared light; and
   a patterned amorphous silicon light diffusing layer on the substrate layer that is configured to receive the infrared light from the substrate layer and to transmit and diffuse the infrared light through the cover layer.

2. The optical system defined in claim 1 further comprising a sealant layer on the patterned amorphous silicon light diffusing layer.

3. The optical system defined in claim 2 wherein the sealant layer has an index of refraction that is at least 1.0 lower than the index of refraction of the patterned light diffusing layer.

4. The optical system defined in claim 3 further comprising an antireflection coating on the sealant layer.

5. The optical system defined in claim 3 further comprising a glass layer, wherein the sealant layer is interposed between the patterned amorphous silicon light diffuser layer and the glass layer.

6. The optical system defined in claim 5 wherein the glass layer has a thickness of at least 0.05 mm, the infrared light diffuser further comprising an adhesive layer between the glass layer and the sealant layer.

7. The optical system defined in claim 6 further comprising an antireflection coating on the glass layer.

8. The optical system defined in claim 1 wherein the patterned amorphous silicon light diffusing layer comprises one of a pair of patterned amorphous silicon light diffusing layers on opposing first and second surfaces of the substrate layer.

9. The optical system defined in claim 1 wherein the patterned amorphous silicon light diffusing layer has light diffusing elements in an irregular pattern on the substrate layer, wherein the light-diffusing elements have lateral dimensions of 10-50 microns and have a thickness of less than 10 microns.

10. The optical system defined in claim 1 wherein the patterned amorphous silicon light diffusing layer is a patterned layer of hydrogenated amorphous silicon.

11. An electronic device comprising:
a light emitter configured to emit near infrared light;
a substrate that is transparent to the near infrared light from the light emitter;
a silicon layer on the substrate that is configured to pass and diffuse the near infrared light from the light emitter; and
a display having a pixel array and a display cover layer overlapping the pixel array, wherein the display cover layer has a window region configured to pass the diffused near infrared light.

12. The electronic device defined in claim 11 wherein the light emitter comprises an array of light emitting devices.

13. An electronic device, comprising:
a light-emitting component configured to emit infrared light; and
a light diffuser covering the light-emitting component, wherein the light diffuser has a substrate and has a light diffusing silicon layer on the substrate that is configured to transmit and diffuse the emitted infrared light, wherein the light diffusing silicon layer has a planar surface at the substrate and a patterned surface opposite the planar surface, and wherein the patterned surface comprises a pattern of non-planar light scattering elements.

14. The electronic device defined in claim 13 wherein the light diffusing silicon layer comprises amorphous silicon.

15. The electronic device defined in claim 13 wherein the light-emitting component comprises at least one light-emitting device that emits light at 940 nm.

16. The electronic device defined in claim 13 wherein the light-emitting component comprises an array of vertical-cavity surface-emitting lasers.

17. The electronic device defined in claim 16 wherein the array of vertical-cavity surface-emitting lasers is configured to emit light at 940 nm.

18. The electronic device defined in claim 17 further comprising:
an infrared camera; and
a display having a display cover layer, wherein at least some of the emitted light at 940 nm is captured by the infrared camera after reflecting from an external object and passing through a portion of the display cover layer.

19. The electronic device defined in claim 13 wherein the light diffuser further comprises a sealant layer on the light diffusing silicon layer and wherein the sealant layer has an index of refraction that is at least 1.5 lower than the light diffusing silicon layer.

20. The electronic device defined in claim 19 further comprising an antireflection coating on the sealant layer.

21. An optical system through which infrared light passes, comprising:
a cover layer configured to transmit the infrared light;
a substrate layer that is transparent to the infrared light; and
a patterned amorphous silicon light diffusing layer on the substrate layer that is configured to receive the infrared light from the cover layer and to transmit and diffuse the infrared light through the substrate.

* * * * *